The invention relates to a novel method of converting heat into electricity and an apparatus therefor, more particularly to a novel galvanic cell-electrolyte regenerator system in which an input of heat yields electric current without the large loss of efficiency inherent in conventional methods.

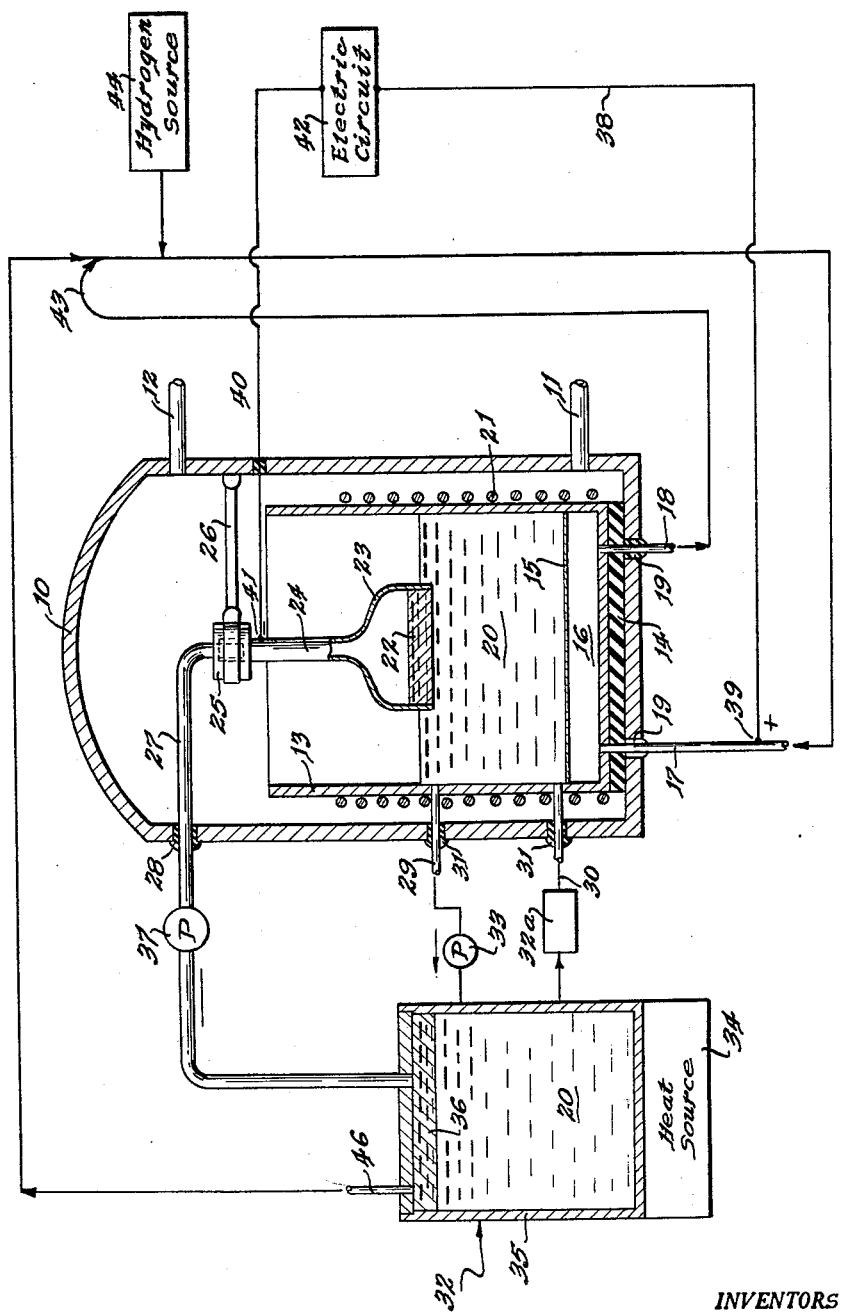
INVENTORS
Carl E. Crouthamel
Melvin S. Foster
BY
Attorney 3,119,723
APPARATUS FOR CONVERTING HEAT
INTO ELECTRICITY
Carl E. Crouthamel, Glenn Ellyn, and Melvin S. Foster, Lockport, Ill., assignors to the United States of America as represented by the United States Atomic Energy Commission
Filed Oct. 30, 1961, Ser. No. 148,772
1 Claim. (Cl. 136—86)

In certain situations large amounts of heat are available which are difficult and expensive to convert to electricity by conventional means. One of these is in nuclear reactors, particularly reactors of the liquid metal-cooled type where at temperatures of around 1000° C. the coolant is unsuitable for direct use in a power-generating turbine, and in the long lengths of piping needed to make a heat exchange with water, leaks are apt to develop, thereby giving rise to a chemical reaction of great violence.

Among the suggestions which have been made for utilizing heat of the kind described as a source of electric power is the so-called "thermally regenerative fuel cell," such as that described in the "Proceedings—Thirteenth Annual Power Sources Conference," Power Sources Division, U.S. Army Signal Research and Development Laboratory, Fort Monmouth, N.J., 1959, pages 122 to 124. Other such cells, or more properly, systems including a galvanic cell and an electrolyte regenerator are described in publications known as MSAR 59–119, MSAR 60–12, and MSAR 60–110 by MSA Research Corporation, a subsidiary of Mine Safety Appliance Company, Callery, Pennsylvania. These publications describe heat conversion systems having galvanic, current-producing cells with a metal anode which is oxidized in a fused, substantially waterless electrolyte, the source of the hydride ions being a diffusing barrier in contact with the electrolyte, through which hydrogen diffuses.

The electrolyte of the cell is continuously circulated in and out through a "regenerator," which is simply a vessel adapted to heat the electrolyte to a temperature above the decomposition temperature of the metal hydrides created in the electrolyte by the reaction of the metal anions from the anode and the hydride cations from the diffusing barrier. The heat causes the hydrides to decompose into hydrogen and metal; the first simply bubbles up through the electrolyte and is easily reused by leading it to the side of the diffusing barrier opposite the electrolyte, and the metal floats to the top where it can be easily skimmed off and, like the hydrogen, be reused, preferably by pumping into the anode in the liquid state. Thus, in a single step, the electrolyte is stripped of its metal hydride values, and the latter are recovered in their decomposed elemental state to be reused in a continuous regenerative cycle. Aside from minor material losses due to cycling, the input into the system consists essentially of heat, and the output of electricity.

Systems of the kind mentioned, while offering great possibilities, have not been practical due to the difficulty of finding a suitable diffusing barrier for the hydrogen into the electrolyte. Barriers of the porous type such as sintered nickel, sintered ceramics, and the like become clogged in their pores sooner or later, and always soon enough to cause the expense of their replacement to more than offset the economies inherent in the galvanic method of producing electricity over the conventional mechanical method. Precious metals of fifth and sixth periods of groups Ib and VIII of the periodic table have the ability to "diffuse" hydrogen without being made porous as by sintering, it being believed that diffusion of this kind takes place between the atoms of the metal itself. Attempts to make use of this phenomenon, however, resulted in failure due to the disintegration of barriers made of these metals in contact with the electrolyte. (E. G. MSAR 60–110, page 5.)

It is, accordingly, the general object of the invention to provide a thermally regenerative galvanic method for converting heat into electricity.

It is a more particular object to provide an apparatus or system for such a conversion.

It is a still more particular object to provide such a system characterized by an improved diffusing barrier for introducing hydrogen into the fused electrolyte.

It is a further object to provide a galvanic cell characterized by such an improved barrier.

Other objects of the invention will appear as the description proceeds.

All the foregoing objects are attained by our discovery that substantially pure iron has the ability to diffuse hydrogen in the same manner as percious metals, but that unlike these, it is resistant to the action of a fused electrolyte, and therefore a diffusing barrier of iron, or one with an iron surface next to the electrolyte, makes possible a really durable and saisfactory galvanic cell employing hydrogen as one of the cell reactants. With this improvement, the operation of a galvanic cell of the thermally regenerative type may be carried on without frequent interruptions for renewal of the diffusing barrier, and the systems of converting heat into electricity outlined in the above-mentioned publications become practical.

In the drawings the only figure is a partly schematic sectional view of the apparatus for carrying out our invention.

Reference numeral 10 designates an outer shell with inert gas inlet 11 and outlet 12 for maintaining an inert gas atmosphere within the shell 10.

Within the shell 10 is a galvanic cell vessel 13 which is electrically conductive and rests on insulating disk 14 on the bottom of shell 10. Vessel 13 has a false bottom or diffusion barrier 15 which is electrically conductive and creates a gas space 16 at the bottom of the vessel 13. Hydrogen inlet line 17 and outlet line 18 maintain a flow of gas throughout the gas space 16 during the operation of the apparatus; these are electrically conductive and are sealed and electrically insulated from shell 10 by lead-in seals 19.

Within the cell vessel 13 is the fused salt electrolyte 20, which is kept molten during operation by coil heater 21 surrounding the vessel 13. The anode consists of a pool 22 of metal which is held in place on top of the electrolyte 20, and away from the walls of the vessel 13 by funnel-shaped anode cap 23 which tapers upward to tube shape 24 where it is gripped by insulator 25, which, in turn, is supported by arm 26 from shell 10.

Above the insulator 25 tube shape 24 is joined by tube 27 which passes out through the shell 10 through insulating seal 28. In similar fashion electrolyte outlet tube 29 and inlet tube 30 pass through insulating seals 31 to the electrolyte regenerator shown generally at 32, pump 33 being interposed therebetween in the outlet line 29 in order to circulate the electrolyte between the cell vessel 13 and the regenerator 32. Heat exchanger 32a in electrolyte inlet line 30 reduces the temperature of the incoming regenerated electrolyte to the operating temperature of the galvanic cell.

Regenerator 32 consists of a heat source shown schematically at 34 since it may be any one of a number of such sources including a nuclear reactor, a fossil fuel burner, a solar heater and the like. Adjacent the heat source 34 is regenerator vessel 35 which holds the circulating electrolyte 20 from the cell vessel 13 for a sufficient period to permit the heat from the heat source 34 to decompose the metal hydride in the electrolyte into hydrogen and metal in the metallic state; the latter will float on the top of electrolyte 20 in a discrete layer 36. Pump 37 in tube 27 then lifts the molten metal 36 out of the regenerator vessel 35 and returns it through tubes 27 and 24 to the anode cap 23 where it becomes part of the metal pool 22.

Current is drawn from the cell by means of positive lead wire 38 electrically connected to the electrically conductive diffusion barrier 15, as through hydrogen inlet line 17 at 39, and by negative lead wire 40 electrically connected to the anode as at 41 on the anode tube 24. These lead to an electric load circuit shown schematically at 42.

Hydrogen resulting from the decomposition of hydride within the regenerator 32 is led back from the regenerator vessel 35 by means of hydrogen line 46 and hydrogen inlet line 17. Any hydrogen that fails to pass through barrier 15 is returned through loop 43 from outlet line 18 into inlet line 17. A supplemental hydrogen source, which is needed to make up the slight loss of hydrogen which occurs in the cycling operation is shown at 44.

In carrying out our invention the essential thing is that the surface of the barrier next to the electrolyte be pure iron. This means that the entire barrier may be substantially pure iron, or it may be a precious metal or precious metal alloy coated with substantially pure iron. The latter permits hydrogen to diffuse faster and thus gives greater current density, but, on the other hand, iron is cheaper and it is a matter of economics in choosing between an iron barrier and one of iron over precious metal. The precious metals referred to are those in the fifth and sixth periods of groups Ib and VIII of the periodic table; these, as already mentioned, have the ability to diffuse hydrogen not through "pores" as in the case of the sintered porous electrodes of conventional fuel cells, but through their interatomic spaces. Our discovery that iron shows this ability, and furthermore that it surprisingly resists the action of the fused electrolyte better than "noble" metals is the basis of our invention.

While we do not wish to be rigorously bound by any theoretical explanation of the operation of our invention, we believe that the ability of the precious metals mentioned and of iron to diffuse hydrogen has a catalytic basis. We believe that on the surfaces of these metals away from the electrolyte molecular hydrogen is converted catalytically into atomic hydrogen and diffuses through the metal in this form. Then on reaching the other surface, next to the electrolyte, or at some time prior thereto during its passage through the barrier, the atomic hydrogen receives an electron from the negatively charged metal of the barrier, which is actually the cathode of the cell, and the hydrogen thereby enters the electrolyte in the form of hydride ion according to the following equation:

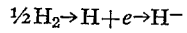

Meanwhile atoms of the anodic metal enter the electrolyte leaving behind on the anode an electron according to this equation:

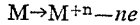

where M is a metal and $n$ is an integer equal to its valence.

The metallic cations and hydride anions then react together within the electrolyte:

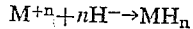

Our explanation that a catalytic action takes place on the surfaces of the precious metal or the iron, changing molecular hydrogen to the atomic state, is substantiated by the fact that if iron on the side away from the electrolyte, or against the gas space 16, is highly polished the diffusion of hydrogen through the iron is inhibited; when an iron barrier is used it must be etched with mineral acid slightly, and the roughening which this imparts to the surface gives it the catalytic effect that promotes hydrogen diffusion.

It is not necessary, however, to roughen either iron or precious metal to any great extent in order to catalyze diffusion. The iron may be commercially rolled iron, and etching it in 2 molar HCl for from two to three minutes is sufficient to give it the necessary surface properties. It should then be rinsed in an organic liquid such as methanol and dried in an inert atmosphere such as argon or helium to prevent surface oxidation. It is not necessary that the surface precious metals be "blackened" or otherwise prepared as in the case of conventional "hydrogen electrodes" of the anode type. When used as the cathode as in the galvanic cell of the present invention, rolled, and even polished precious metal such as platinum, palladium, silver and the like, serve quite well. A slight, but hardly significant benefit appears to come from surface blackening.

We have found that the diffusing barrier should be, in the case of a barrier of iron, from about 0.1 mil to 10.0 mils thick. Below this range the barriers are mechanically weak, and above it diffusion of hydrogen becomes unacceptably slow, resulting in too small a current density. For barriers of precious metal coated with iron we have found to be satisfactory an alloy of 80 weight percent palladium and the balance silver, about 10 mils thick and coated with a tenth of a mil of cathode-sputtered iron on one side. A platinum-palladium alloy barrier of the same thickness with the same iron coating may also be satisfactory. Pure palladium or pure platinum with an iron coating may also be used.

In general the barriers having precious metal substrates permit a faster rate of diffusion than pure iron barriers; the improvement over iron is on the order of a factor of two, but whether this is great enough to pay for the increased cost of the barrier depends, of course, on the economics of the particular galvanic cell and conversion system. We are inclined to believe that since the decreased current density of an iron barrier can be compensated for simply by increasing the area of the barrier, this will be adopted more widely than holding the area constant and increasing the current density by the use of composite barriers employing precious metals.

As to the electrolyte, many compounds or mixtures thereof are theoretically usable, the only rigorous requirements being that they do not react in some competitive way with the metal or with the hydrogen, that they be stable at the operating temperatures of the system and, lastly, of course, that they do not dissolve the anode metal to any appreciable extent. The first mentioned requirement rules out aqueous and most polar organic electrolytes, and also oxides and hydroxides; the second rules out nitrates and sulfates which decompose at the temperatures needed. Sulfides, selenides and phosphides are all possibilities, but to be preferred by far are halides, especially chlorides of the alkali and alkaline earth metals. Fluorides and bromides of these may, however, be used in some cases. We prefer mixtures since these have lower melting points than pure substances, and especially eutectic mixtures. For a cell having a lithium anode, we have found the LiCl-KCl eutectic gives excellent results. Its low melting point makes it possible to operate the galvanic cell at from about 350° to 400° C.

It might be added that we have found that a certain degree of impurity can be tolerated in the electrolyte. All last traces of water, oxides, and hydroxides need not be rigorously excluded.

In general the cell may be operated slightly above the melting point of the electrolyte. This often means that anodic metals such as lithium, sodium and potassium will be in the liquid state, but this is not necessarily the case and a cell can operate perfectly well if the anodic metal remains solid. However, thermodynamics along with practical considerations favors the use of the lighter alkali metals; the other metals of group Ia of the Periodic Table, rubidium and cesium, of course, have excellent thermodynamic properties so far as their operability is concerned, but their high cost makes their use unlikely. In addition to the metals of group Ia, those of groups IIa and IIIa are operable, though none of them, with the possible exception of calcium, are thermodynamically and practically attractive. Yttrium and the rare earths have good thermodynamic properties but are expensive, and the same is even more true of the lanthanide elements. Alloy anodes are possible, but, of course, pure metal anodes are simpler and generally preferable.

As has already been indicated, an inert atmosphere is essential for the operation of the galvanic cell, and also for the electrolyte regenerator which will be described later.

The galvanic cell of the invention will give a voltage dependent on the anode employed. For a lithium anode utilizing the LiCl-KCl eutectic electrolyte the initial voltage will be about 0.75, which will quickly fall to about 0.6 and remain there quite steadily so long as the hydride content does not become so great as to inhibit the cell reaction. Steady regeneration of the electrolyte by circulating it on a continuous basis will maintain the voltage at the latter value indefinitely, and in the case of other light alkali metal anodes, similar steady voltages can be sustained.

The gas flow of hydrogen need only be sufficient to maintain the gas space, such as the gas space 16 in the drawing, at atmospheric pressure. Superatmospheric pressure will increase diffusion, but not enough to justify the expense necessary to achieve it. In general the amount of hydrogen needed will be but slightly more than the stoichiometric amount required to react with the metal of the anode to produce a hydride, that is to say, half a mole of hydrogen per mole of monovalent anodic metal, or one mole per mole of divalent metal such as calcium. There appears to be a slight loss of hydrogen, in the neighborhood of 5 to 11%, so that from about 105 to 111% of the stoichiometric is actually required. This loss can be compensated for by providing an outside source of hydrogen to supplement the hydrogen recovered in the electrolyte regenerator.

The electrolyte regenerator need only have a vessel to hold the circulating electrolyte and maintain an inert atmosphere, and a heat source to raise the temperature sufficiently to cause the decomposition of the metal hydride created in the galvanic cell reaction. When the cell has a lithium anode, for example, an operating temperature of 1000° C. in the regenerator is satisfactory since LiH decomposes at about 850° C. No harm is done, of course, by raising the temperature considerably higher than the decomposition point of the hydride, since the heat energy will be utilized in hastening the decomposition.

Since the electrolyte has already been chosen so as not to appreciably dissolve the metal, and since molecular hydrogen is largely insoluble in any fused electrolyte, the metal and the hydrogen will virtually strip themselves from the electrolyte as soon as the decomposition temperature is attained. Thus two steps will be combined in one and the physical removal of the metal and hydrogen will be all that is necessary. The gaseous hydrogen is easily led for reuse in a gas line, and the metal may be either skimmed off or bled off, depending on whether it is lighter or heavier than the electrolyte.

While we believe our invention will probably find its greatest utility in a thermally regenerative system including both one or more galvanic cells and one or more regenerators, it is conceivable that in certain situations the galvanic cell alone will prove to be useful. For example, a cell employing a cheap metal such as sodium might be useful in remote locations even without a regenerative system. Hence we regard our invention to include such cells, since our discovery of an iron-surfaced barrier would be equally applicable thereto.

*Example*

A galvanic cell of the general type shown in the drawing had a cell vessel fabricated of substanatially pure iron in circular cylindrical shape, 4½ inches in inside diameter and 4½ inches high, with hydrogen inlet and outlet lines in the bottom and a lead-in wire attached to the inlet line. A 4½-inch circular disk of commercially available substantially pure rolled iron, 10 mils thick, was etched in 2 M HCl for 3 minutes, rinsed in methanol, and dried in an argon atmosphere. The disk was then welded into the cylinder in an argon atmosphere ¼ inch above the bottom, thereby defining a gas space 4½ inches in diameter and ¼ inch high.

Maintaining the argon atmosphere, sufficient LiCl-KCl eutectic mixture was placed in the cell vessel to make a volume about one inch deep of fused electrolyte on heating to about 400° C. A funnel-shaped anode cap 1⅜ inches in inner diameter was filled with lithium and lowered into contact with the surface of the fused electrolyte. A lead-in wire was attached to the tubular part of the anode cap.

The cell gave a voltage of 0.75 v. initially which decreased rapidly to a steady state of around 0.6009 v. over a total period of cell operation of 216 hours, at a current density of about 28 amperes per square foot of anode area.

Hydrogen pressure was maintained in the gas space at about 762 mm. Hg, and the cell temperature was maintained at about 400° throughout its operation. The efficiency of hydrogen utilization was found to be 89%.

It will be understood that this invention is not to be limited to the details given herein, but that it may be modified within the scope of the appended claim.

What is claimed is:

In a galvanic cell having an anode of at least one anodic metal, an electrolyte vessel, a fused electrolyte within the electrolyte vessel, a gas diffusible metal barrier forming a gas space on the bottom of said vessel and a compartment for said electrolyte, and means for leading hydrogen gas into the gas space, the improvement wherein said barrier is of silver-palladium alloy having its surface in contact with the electrolyte covered with sputtered iron.

References Cited in the file of this patent

UNITED STATES PATENTS

| | | |
|---|---|---|
| 1,951,280 | Hale | Mar. 13, 1934 |
| 2,175,523 | Greger | Oct. 10, 1939 |
| 2,384,463 | Gunn et al. | Sept. 11, 1945 |
| 2,860,175 | Juste | Nov. 11, 1958 |
| 3,020,327 | Ruetschi | Feb. 6, 1962 |
| 3,031,518 | Werner et al. | Apr. 24, 1962 |

FOREIGN PATENTS

| | | |
|---|---|---|
| 271,581 | Great Britain | June 2, 1927 |
| 521,773 | Great Britain | May 30, 1940 |

OTHER REFERENCES

Status Report on Fuel Cells, B. R. Stein, ARO Report No. 1, June 1959, page 23, United States Dept. of Comm., Office of Technical Services.

Power Sources Conference, 13th, 1959, Fort Monmouth, New Jersey, Proceedings, Power Sources Division, U.S. Army Signal Research and Development Laboratory.

Metal Handbook, volume 1, 8th edition, July 1961, pages 600–601.